(12) United States Patent
Cole et al.

(10) Patent No.: US 7,345,618 B1
(45) Date of Patent: Mar. 18, 2008

(54) MOVING-ENTITY DETECTION

(75) Inventors: Stephen Cole, Orlando, FL (US);
William Steinway, Smyrna, GA (US);
Daniel O'Donnell, Orlando, FL (US);
Richard Sheldon, Orlando, FL (US);
James McNeill, Orlando, FL (US);
Ronald Hill, Port Orange, FL (US);
Raymond Gill, St. Cloud, FL (US)

(73) Assignee: L-3 Communications CyTerra Corporation, Orlando, FL (US)

( * ) Notice: Subject to any disclaimer, the term of this patent is extended or adjusted under 35 U.S.C. 154(b) by 0 days.

(21) Appl. No.: 11/428,956

(22) Filed: Jul. 6, 2006

Related U.S. Application Data

(63) Continuation of application No. 11/279,859, filed on Apr. 14, 2006, now abandoned.

(60) Provisional application No. 60/671,105, filed on Apr. 14, 2005.

(51) Int. Cl.
*G01S 13/89* (2006.01)
*G01S 13/04* (2006.01)
(52) U.S. Cl. .......................................... 342/22; 342/28
(58) Field of Classification Search ................. 342/22, 342/27, 28
See application file for complete search history.

(56) References Cited

U.S. PATENT DOCUMENTS

| | | | | |
|---|---|---|---|---|
| 5,345,240 | A | * | 9/1994 | Frazier .......................... 342/22 |
| 5,446,461 | A | * | 8/1995 | Frazier .......................... 342/22 |
| 2004/0232329 | A1 | * | 11/2004 | Biggs .......................... 250/306 |
| 2005/0128124 | A1 | * | 6/2005 | Greneker et al. ............. 342/22 |
| 2005/0270219 | A1 | * | 12/2005 | Dwelly et al. ................ 342/22 |
| 2006/0028369 | A1 | * | 2/2006 | Rausch et al. ................ 342/22 |
| 2006/0061504 | A1 | * | 3/2006 | Leach et al. .................. 342/22 |
| 2006/0170584 | A1 | * | 8/2006 | Romero et al. ............... 342/22 |
| 2006/0250294 | A1 | * | 11/2006 | Zemany et al. ............... 342/22 |
| 2007/0024488 | A1 | * | 2/2007 | Zemany et al. ............... 342/22 |

* cited by examiner

*Primary Examiner*—Ian J. Lobo
(74) *Attorney, Agent, or Firm*—Fish & Richardson P.C.

(57) ABSTRACT

Sensing moving entities includes transmitting a stepped-frequency radar signal including multiple frequencies through a wall from a first side of the wall to a second side of the wall. Portions of the radar signal that are reflected by entities located beyond the second side of the wall are detected. The reflected portions are processed to generate processed data including information associated with frequency shifts between the transmitted signal and the detected signal. The processed data is analyzed to determine if reflected portions are associated with moving entities.

22 Claims, 11 Drawing Sheets

MOVING-ENTITY DETECTION

CROSS-REFERENCE TO RELATED APPLICATION

This application is a continuation application of U.S. application Ser. No. 11/279,859 filed Apr. 14, 2006, and titled MOVING-ENTITY DETECTION, which claims priority to U.S. Provisional Application No. 60/671,105, which was filed on Apr. 14, 2005, and titled WALL PENETRATING PERSONNEL DETECTION SENSOR (WPPDS), both of which are incorporated by reference in their entirety.

STATEMENT REGARDING FEDERALLY SPONSORED RESEARCH OR DEVELOPMENT

The U.S. Government may have certain rights in this invention as provided for in the terms under agreement number W15P7T-05-9-P232 awarded by DARPA and the US Army Communications-Electronics Command.

TECHNICAL FIELD

This description relates to a detecting moving entities, such as detecting the presence of a moving person concealed behind a wall in a building.

BACKGROUND

Detection sensors may be used to determine the presence of objects when visual recognition is difficult.

SUMMARY

In one general aspect, sensing moving entities includes transmitting a stepped-frequency radar signal including multiple frequencies through a wall from a first side of the wall to a second side of the wall, detecting reflected portions of the radar signal that are reflected by entities located beyond the second side of the wall, processing the reflected portions to generate processed data including information associated with frequency shifts between the transmitted signal and the detected signal, and analyzing the processed data to determine if reflected portions are associated with moving entities.

Implementations may include one or more of the following features. For example, analyzing the processed data may include calibrating the processed data, such as by compensating for reflections near or behind the device. Calibration may be performed for each separate attempt to sense moving entities.

Analyzing the processed data may include removing information associated with reflections from stationary objects or from objects within a proximity to the device. Analyzing the processed data also may include performing a Fourier transform on information associated with the processed data, and degraded performance may be detected based on whether results of the Fourier transform satisfy a condition. Similarly, a first Fourier transform with a first integration time and a second Fourier transform with a second integration time longer than the first integration time may be performed on the same information associated with the processed data, and degraded performance may be detected based on whether first results of the first Fourier transform satisfy a first condition and results of the second Fourier transform satisfy a second condition different from the first condition. Analyzing the processed data may include analyzing frequency and phase shifts between the transmitted signal and the detected signal to determine movement of objects at a distance.

In another general aspect, a system for sensing moving entities includes a stepped-frequency radar transmitter coupled to a transmit antenna to transmit a stepped-frequency radar signal, a receive antenna configured to detect reflected portions of the radar signal, and a processor operable to process, for a multiple frequencies, the reflected portion of the radar signal from the receive antenna and to analyze the processed data to determine the presence of moving entities on an opposite side of a wall from a side of the wall on which the system is located.

Implementations may include one or more of the following features. For example, the system may include a demodulator which receives both the stepped-frequency radar signal and a reflected portion of the radar signal, and outputs in phase and out of phase data. The system may be configured to be operable using AA batteries.

The processor may be configured to remove information associated with signal reflection from stationary objects or from objects within a proximity to the device. The processor also may be configured to perform a first Fourier transform with a first integration time and a second Fourier transform with a second integration time longer than the first integration time on the same information associated with the processed data.

The details of one or more implementations are set forth below. Other features will be apparent from the description and drawings, and from the claims.

DESCRIPTION OF DRAWINGS

Like reference symbols in the various drawings indicate like elements.

DETAILED DESCRIPTION

In order to detect the presence of entities through movement when visual detection is blocked (e.g., by a wall), a device, such as a handheld scanner, includes a stepped-frequency radar transmitter. The transmitter emits a radar based signal that includes different frequencies. The emitted signal strikes objects and is partially reflected. The reflected signal may be affected by environmental characteristics (e.g., movement of an object or entity or distance to the object or entity). For example, if an object is moving closer to the device, signals reflected from the object will exhibit a frequency shift (i.e., a Doppler shift) that may be observed and processed by the device. Also, the distance a signal travels before being partially reflected affects the phase of the reflected signal at the receiver. The processing methodology used by the device determines when the reflected signal appears to result from movement of an object or entity at a distance.

Detecting differing rates of movements may require separate processing algorithms and/or separate characteristics of the transmitted signal. For example, in one implementation, a shorter duration (e.g., a few seconds) of signal transmission at a set of frequencies may be transmitted to detect fast moving objects, such as an individual running. A longer duration (e.g., less than 10 seconds) signal transmission may be employed to detect slower moving objects, such as the chest cavity of an individual breathing.

The device may be used to aid in military or search and rescue missions. For example, soldiers may use the device to detect the presence of unknown individuals that may be hiding behind walls. A soldier may activate the device while aiming the transmitter such that the signal is pointed at a closed door. The signal may penetrate walls and doors, and partially reflect when striking an individual (e.g., an enemy soldier). If the individual is moving, the reflected portion of the signal may exhibit a frequency shift detectable by the device. The device receives and processes the reflected signal, and may determine the presence of one or more entities. Also, the device may be used to detect the presence of individuals buried in piles of rubble based on movement such as breathing.

Figure 1A:
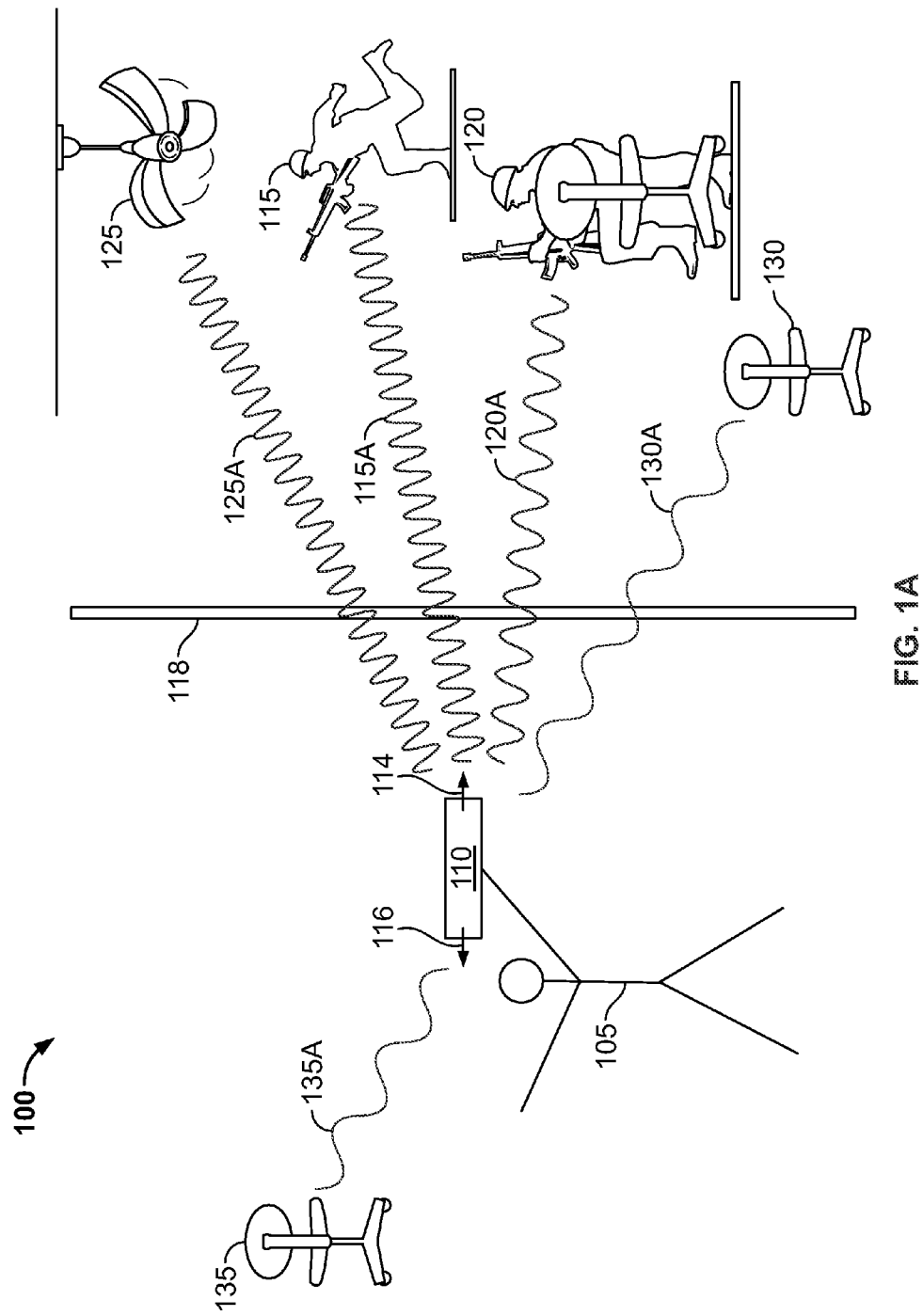
FIG. 1A is a diagram illustrating a use of a stepped-frequency scanner for detecting moving entities.

FIG. 1A shows an example use 100 of a stepped-frequency sensor device configured to detect moving entities. A user 105 holds an activated handheld stepped-frequency sensor device 110, which transmits stepped-frequency radar signals. Although multiple signals are transmitted by the stepped-frequency sensor device, a single transmitted signal is described with respect to FIG. 1A for brevity. The device 110 may include a forward looking antenna 114 and a backward looking antenna 116. The device 110 may differentiate between signals received from the forward looking antenna 114 and those received from the backward looking antenna 116 to determine information associated with the location of detected movement (e.g., whether the movement occurs in front of or behind the device).

The signal may penetrate a wall 118 and be partially reflected by a running individual 115, a sitting individual 120, a spinning ceiling fan 125, and a stationary chair 130 on the opposite side of the wall. The signal also is partially reflected by a nearby stationary chair 135 that is on the same side of the wall 118 as the user 105. The signal 120A reflected by the sitting individual 120 exhibits a small frequency shift due to the breathing movement of the individual's chest cavity. The signal 115A reflected by the running individual 115 exhibits a larger frequency shift than the partially reflected signal 120A from the sitting individual 120, with this frequency shift being due to the more pronounced movement of the body of the running individual 115. The signal 125A reflected by the spinning ceiling fan 125 exhibits a frequency shift that is characteristic of a repeated mechanical movement. The signals 130A and 135A that are reflected by the stationary chair 130 and the nearby stationary chair 135 exhibit no frequency shift.

The stepped-frequency sensor device 110 receives and processes the frequency and phase information from the partially-reflected signals 115A, 120A, 125A, 130A, and 135A. The signals may be received using a single antenna or using forward and backward looking antennas. In an initial scan function, the handheld stepped-frequency sensor device 110 calibrates against data associated with partially-reflected signals 115A, 120A, 125A, 130A and 135A that exhibit no frequency shift 130A and 135A or only a frequency shift due to mechanically repeated movement (e.g., the ceiling fan 125) and data associated with the nearby chair 135 that is located behind the device 110. The processed data indicates movement reflective of both breathing and running. The handheld stepped-frequency sensor device 110 provides an indication that a person who is breathing and not otherwise moving and a person who is running have been detected. In some implementations, the handheld stepped-frequency sensor device may provide the indications by lighting separate lights or providing other types of visual indicators on the handheld stepped-frequency sensor device.

Figure 1B:
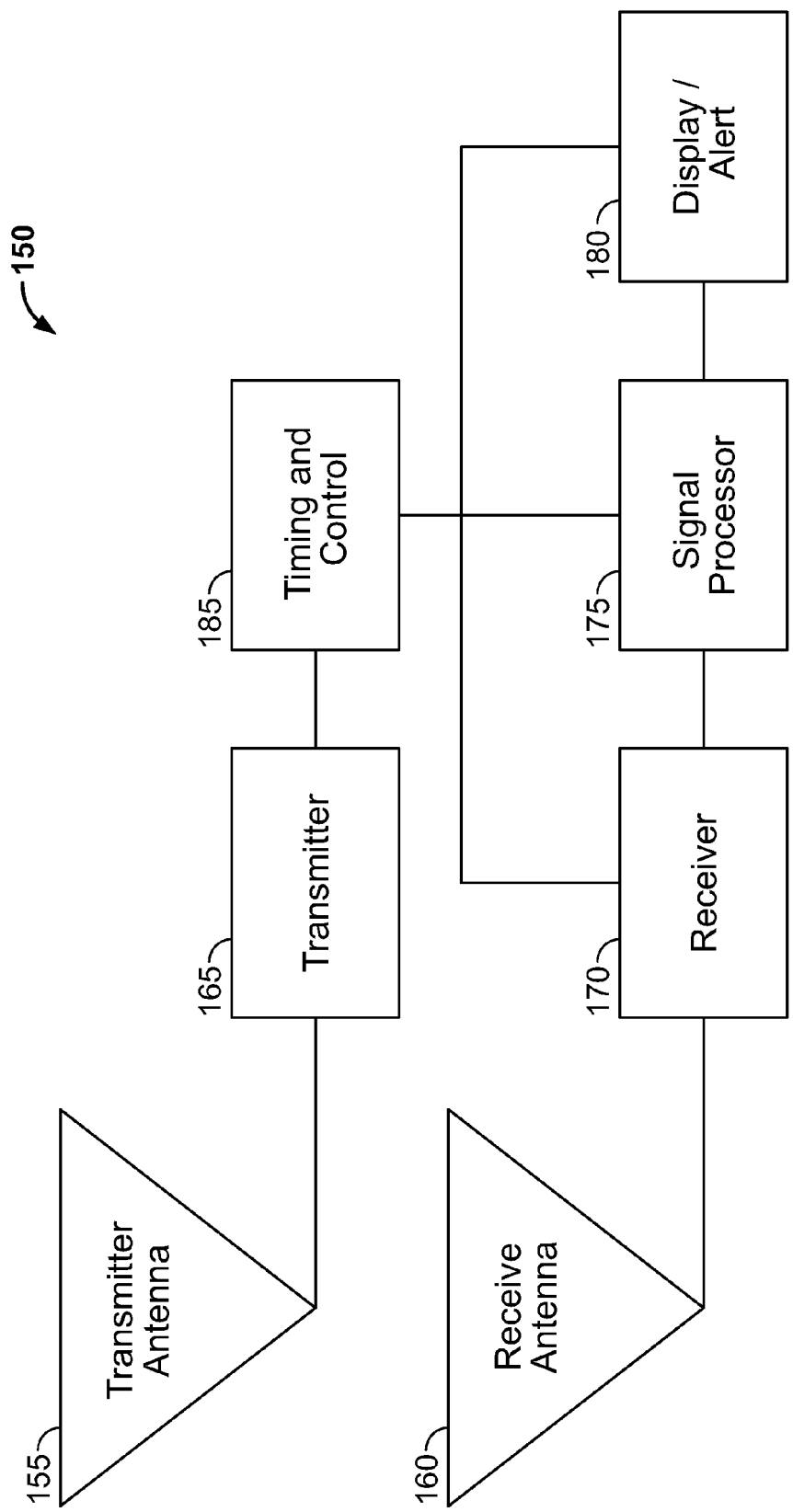
FIG. 1B is a block diagram of a stepped-frequency scanner configured to detect moving entities.

Referring to FIG. 1B, a device 150, such as a handheld stepped-frequency radar scanner, includes antennas 155 and 160 for transmitting and receiving a stepped-frequency radio frequency signal (an "RF signal") to detect moving entities. The device 150 is shown as a bistatic radar system, in that there are separate antennas for transmitting and receiving the RF signal. In particular, the antenna 155 is connected to a radar transmitter and transmits an RF signal toward a target, and the antenna 160 is connected to a radar receiver and receives a portion of the RF signal that is reflected by the target. In another implementation, device 150 may be a monostatic radar system that uses a single antenna to transmit and receive the RF signal. The following discussion assumes that the antenna 155 is the transmitting antenna and the antenna 160 is the receiving antenna.

The transmit antenna 155 is connected to a radar transmitter 165 that transmits an RF signal toward a target. The RF signal includes frequencies that cover a bandwidth in increments of frequency steps. For example, the signal may include a nominal frequency operating with a center frequency in the UHF, L, S or X bands.

The receive antenna 160 is connected to a radar receiver 170 and receives the reflected RF signal from the target. The receiver 170 is coupled to a signal processing system 175 that processes received RF signals from the receiving antenna 160. The signal processing system 175 is coupled to a display 180 and a timing and control module 185. The display 180 provides an audible and/or a visual alert when an object is detected by the scanner. The timing and control module 185 may be connected to the transmitter 165, the receiver 170, the signal processor 175, and the display 180. The timing and control module provides signals, such as a clock signal and control signals, to the other components of the device 150.

Implementations may employ detection processes for slow or fast movement that run in real-time on an embedded processor. Implementations also may employ interference detection processes.

Figure 2A:
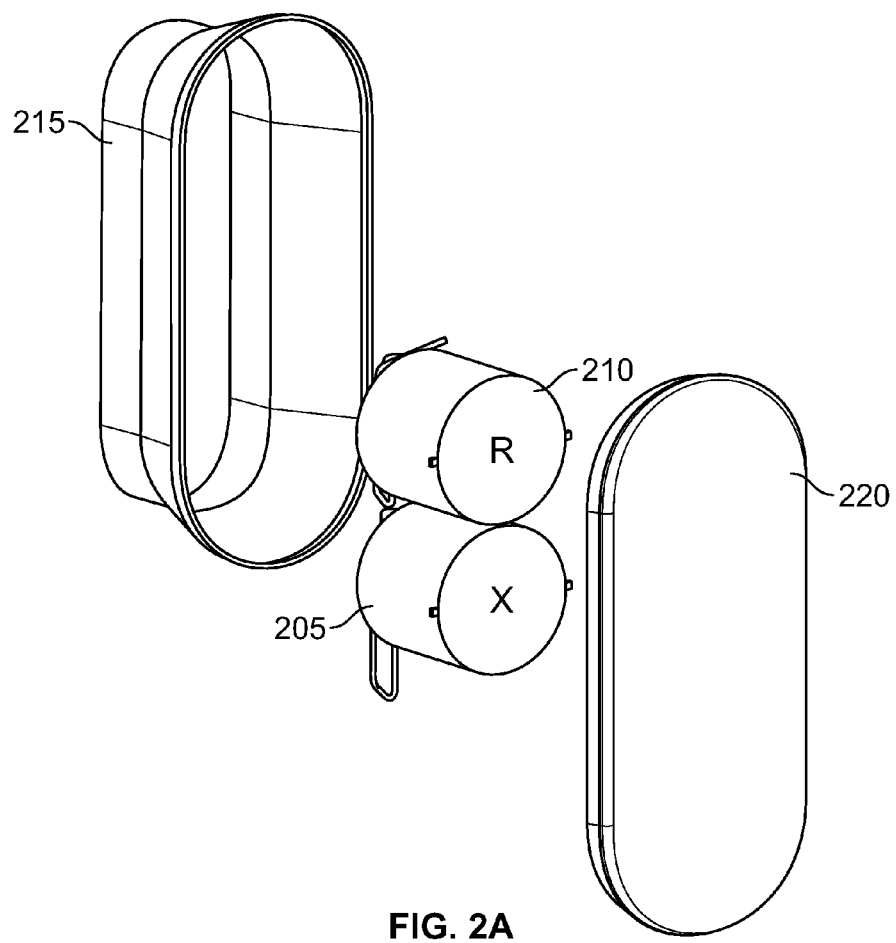
FIGS. 2A and 2B are perspective views of an antenna design for the system of FIG. 1B.

FIG. 2A illustrates an antenna design 200 employed in one implementation of the device of FIG. 1B. The design 200 employs separate transmit 205 and receive 210 antennas to simplify the electronics, provide spatial separation and reduce very shallow reflections. The antennas 205 and 210, which may serve as particular implementations of the antennas 105 and 107 of FIG. 1B, may be placed in a housing 215, and a cover 220 may be placed over the antennas. The cover 220 may be made of a suitable radome material.

Figure 2B:
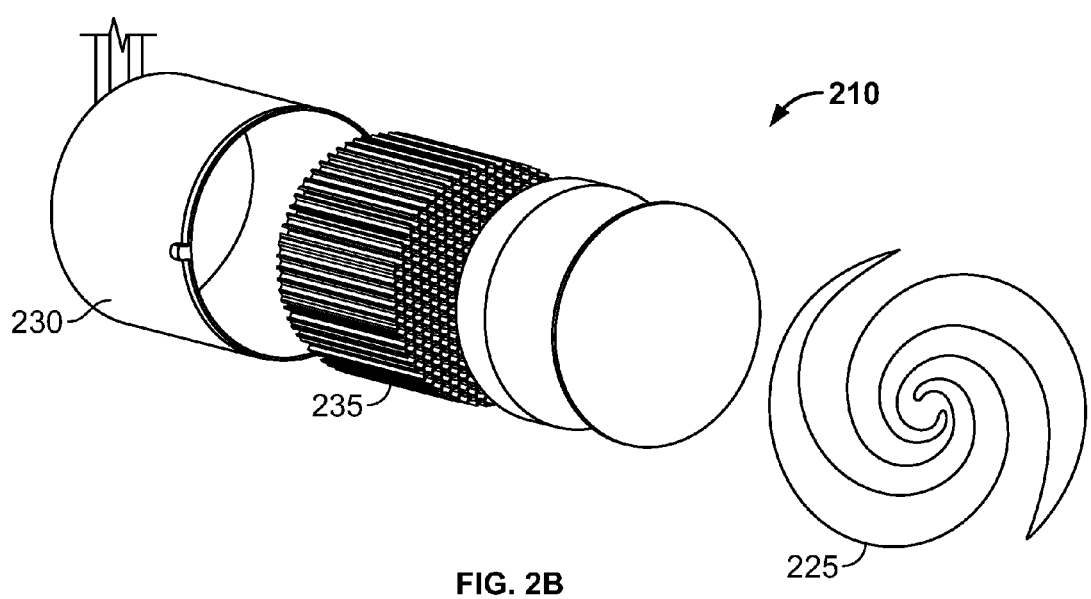

FIG. 2B further illustrates aspects of the antenna design 200 discussed above with respect to FIG. 2A. Although the following discussion refers to receive antenna 210, it is equally applicable to transmit antenna 205 or other antennas. As shown, the design 200 employs a spiral antenna 210 that permits significant size reduction. For an antenna to be an efficient radiator, it must normally have a dimension of at least one-half wavelength. The spiral radiates efficiently when it has an outer circumference of at least one wavelength. This means that the antenna needs a maximum diameter of about one-third wavelength. The upper frequency limit for efficient spiral radiation is set by the size of the feed point attachments, and the lower frequency limit is set by the outer diameter of the spiral structure. Within these limits, the spiral radiates efficiently in a frequency-independent manner. The input impedance and the radiation patterns will vary little over this frequency range. The spiral antenna 210 may be constructed by etching a spiral pattern on a printed circuit board. A planar, printed circuit, spiral antenna radiates perpendicularly to the plane of the spiral. The spiral 225 itself is located at the end of a cylindrical metal cavity 230 (the cavity back) to provide isolation from neighboring elements and electronics. Typically, an absorber 235 is used on the top side of the spiral inside the cavity 230 to make sure the element responds only downward.

The previous description provides an exemplary implementation of an antenna design. Other implementations may include different antennas, such as an endfire waveguide antenna. Such a configuration may be slightly larger than the spiral configuration. The endfire waveguide antenna reduces the measurement spot size, thus making the exact position of the concealed object detected easier to locate. Other suitable types of wideband antennas may also be used.

Figure 3:
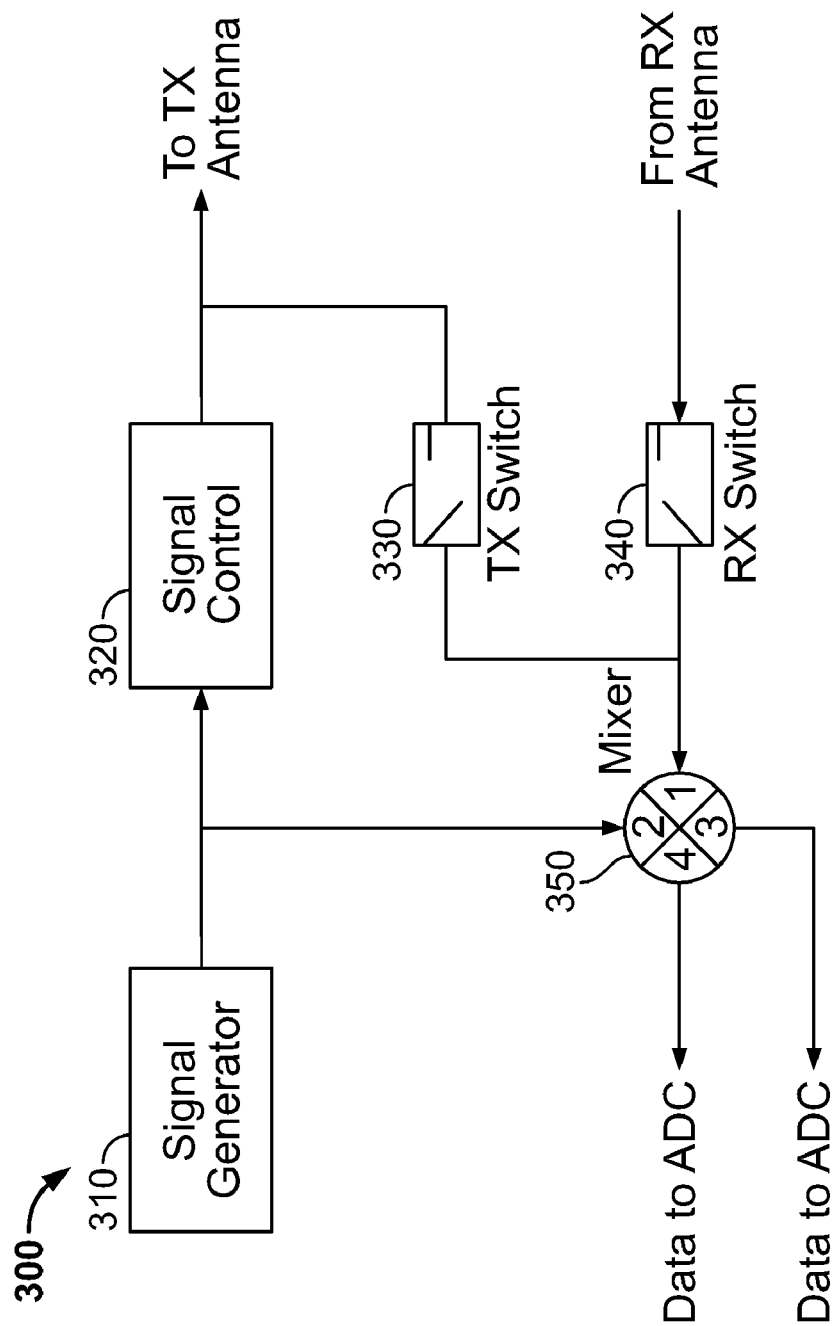
FIG. 3 is a diagram of an exemplary conversion system.

Referring to FIG. 3, a conversion system 300 includes a signal generator 310, a signal control 320, a transmission switch 330, a receive switch 340, and a mixer 350, which may be in the form of a quadrature demodulator. In the system 300, a transmission signal is generated and transmitted through a transmission antenna. Reflected portions of the transmitted signal are received through a receive antenna, which may optionally be the same antenna as the transmission antenna. The antenna signal and the generated signal are input to the mixer 350, which outputs an in-phase signal and an out-of-phase (quadrature) signal.

The signal generator 310 generates a signal to be broadcast by the antenna. The signal generator 310 may include a phase lock loop synchronized by an oscillator. In one implementation, a temperature controlled crystal oscillator is used to synchronize a voltage controlled oscillator. The signal generated by the signal generator 310 may be input to a mixer 350 and to a signal control 320. The signal control 320 may amplify or otherwise conditions the signal to enable transmission by the transmission antenna. The signal control 320 inputs the signal to the transmission antenna and to a transmission switch 330. The transmission switch 330 enables feedback of the transmission signal to the mixer 350. The transmission switch 330 may include, for example, a single pole double throw (SPDT) switch.

The transmission antenna emits the controlled signal and strikes objects in the environment. Portions of the transmitted signal may be reflected. The reflected portions, which may exhibit a frequency and phase shift, are received by the receive antenna. The receive antenna inputs the received signal to a receive switch 340 that enables connection of the signal to the mixer 350. The receive switch 340 may include, for example, a SPDT switch.

Some implementations may use other mechanisms, such as a control system, in place of the transmission switch 330 and the receive switch 340. In one implementation, the receive antenna is input directly to a mixer without a switch.

The mixer 350 receives the signal from the signal generator 310 in an input. In another input, either the transmission signal or the received signal is received by the mixer 350, based the transmission switch 330 and the receive switch 340. The mixer 350 converts input signals to a form that is more easily processed, such as, for example, an in-phase and an out of phase component at a baseband frequency.

As shown, the mixer 350 is a quadrature demodulator, though other signal conversion systems may be used. The quadrature demodulator outputs "I" and "Q" data (referred to as IQ data). The output signals may be processed, as discussed with respect to FIGS. 5 and 6, to determine the frequency and phase shifts between transmitted and received signals that may be indicative of movement at a distance. In some implementations, separate IQ data may be generated for each transmitted frequency.

The previous description is an example implementation of the transmit and receive system. Other implementations may include different components. For example, in various implementations, a backward looking antenna may be included to help eliminate signal clutter. Signals from the backward looking antenna may also be converted to IQ data and processed.

Figure 4:
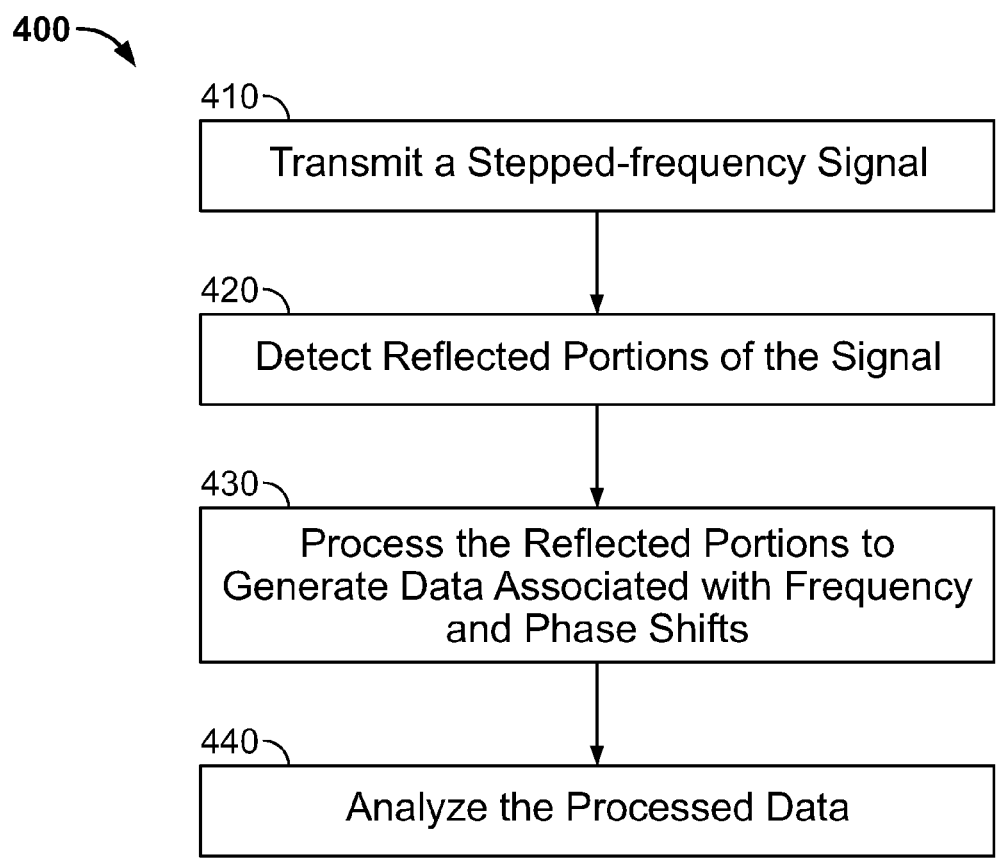
FIGS. 4 and 5 are flow charts of processes for detecting moving entities.

FIG. 4 shows a process 400 to detect moving entities. The process 400 may be implemented on the system 150 of FIG. 1B or another system. The process 400 begins when a stepped-frequency signal is transmitted by a stepped-frequency sensor device (step 410). The stepped-frequency radar signal may be a radar signal including multiple frequencies and phases that are transmitted concurrently or consecutively. In one implementation, each transmission includes a frequency bandwidth that includes multiple transmitted frequencies that are separated by frequency steps. While cycling through the bandwidth, each frequency is transmitted for a period of time, followed by the next frequency, until the bandwidth has been crossed. Although multiple frequencies may be sent, one after another, the transmitted and received signals are discussed as a single signal to simplify discussion. After transmission, the signal strikes an object and is partially reflected.

The stepped-frequency sensor device detects the reflected portion of the signal (step 420). This may be accomplished, for example, by using a transceiver, a separate antenna, or multiple separate antennas (e.g., a forward looking and backward looking antennas). The detected signal includes a frequency that may have been altered by movement of the struck object and a phase that may be affected by the distance to the object.

The stepped-frequency sensor device processes the reflected portions of the signal (step 430). The processing, for example, may identify information associated with frequency and phase shifts that may be indicative of the presence of moving objects or entities at a distance. The processing may include a calibration step to calibrate the data or processing steps based on conditions detected for a particular use of the device. Calibration may include removing or altering parts of the signal indicative of clutter, repeated mechanical movement, or reflections near or behind the device. Processing may also include calibration of the analysis steps, such as integration time.

The stepped-frequency sensor device analyzes the data to determine if the reflected portions of the signal are associated with moving objects or entities (step 440). This may include, for example, Fourier transforms for multiple integration times. The process 400 is an example implementation of a process to sense moving entities using a stepped-frequency sensor device. Some implementations may include additional or alternative steps. For example, processing and analyzing the data (steps 430 and 440) may be conducted in a single step.

Figure 5:
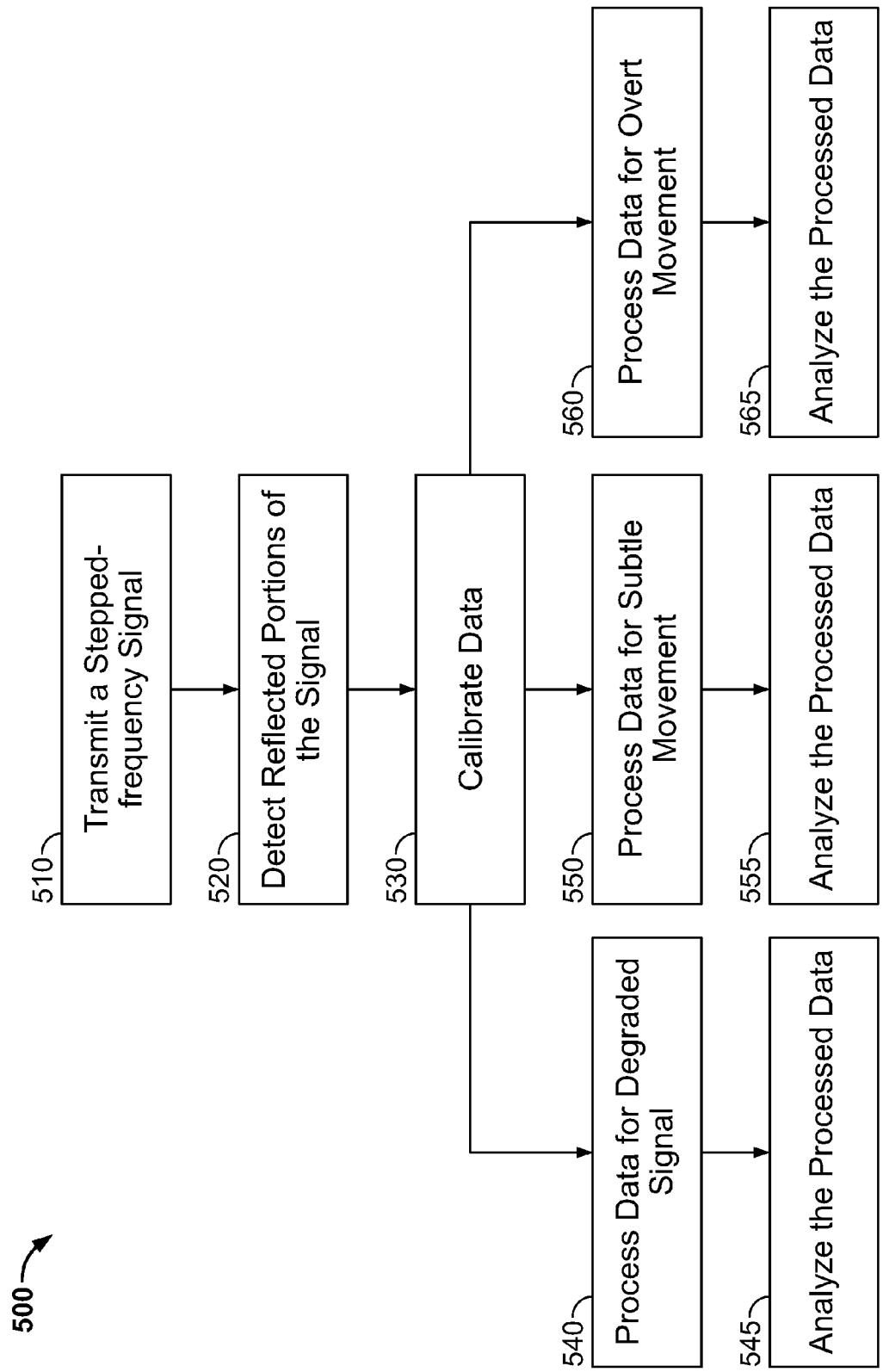

Referring to FIG. 5, a process 500 to detect moving entities may be implemented on the system 100 of FIG. 1B or another system. In the process 500, multiple signal processing techniques may be employed. In one implementation, the user may, at the time of use, determine which process method or methods to employ. In other implementations, the device may be configured to determine the processing method or methods to employ, for example, based on data calibration.

The stepped-frequency sensor device transmits a stepped-frequency signal (step 510) and detects the reflected portion of the signal (step 520). This may be accomplished, for example, as described previously with respect to steps 410 and 420 of FIG. 4. Additionally or alternatively, detecting the reflected portion of the signal (step 520) may include converting the reflected portion of the signal to a usable form, such as, for example, down-converting the signal to a baseband frequency and/or converting the signal with an analog-to-digital converter.

The stepped-frequency sensor device calibrates data associated with the reflected portions of the signal (step 530). Calibration may include removing or altering data associated with parts of the signal indicative of clutter, repeated mechanical movement, or reflection near or behind the device. Calibrating the signal may also include determining which processing method or methods, among multiple possible processing methods, are appropriate, given the signal contents. For example, if the data is indicative of too much or too little reflected signal being received, the calibration step may enable a degraded signal process (step 540). Also, calibration may be used to tweak processing methods. For example, integration times may be increased or decreased to facilitate processing and analysis.

A degraded signal process (step 540) processes the data to determine reliability of the results produced. The degraded signal process (step 540) monitors for data that is, for example, indicative of situations including detection of A/D converter saturations or unusually high signal levels that may arise from the transmitted signal reflecting off metal objects buried within or behind walls, detection of significant increases in the noise floor resulting from intentional or unintentional jamming, or detection of significant signal energy across all range cells associated with excessive movement of the antenna. The processed data is analyzed (step 545) to determine if an alert or indication is needed to communicate to the user that the signal is degraded.

A subtle movement process (step 550) includes processing specialized to detect smaller movement. The subtle movement process (step 550) may be optimized for detection of stationary personnel whose only significant movement is that caused by respiration. The subtle movement process (step 550) may, for example, employ a longer integration time or a higher Doppler resolution. The processed data is analyzed (step 555) to determine if an alert or indication is needed to communicate to the user that subtle movement has been detected.

An overt movement process (step 560) includes processing optimized to detect rapid movement. The overt movement process (step 560) is optimized for detection of walking or moving personnel. For example, each transmit frequency may be processed by a separate filter to enable detection of short duration movements from the arms and legs of stationary personnel as well as the detection of the main body movement, such as walking and running. The processed data is analyzed (step 565) to determine if an alert or indication is needed to communicate to the user that rapid movement is detected.

The process 500 is an example implementation of a process to sense moving entities using a stepped-frequency sensor device. Other implementations may include additional or alternative steps. For example, each of the subtle movement processing (step 550) and the overt movement processing (step 560) may include a feature that determines whether degraded signal processing (step 540) should be employed.

FIGS. 6-9B, and the discussion below, refer to a set of specific implementations of the device. The specific implementations are referred to as wall penetrating personal detection sensors (WPPDS) and are provided as one possible set of implementations of a sensor for detecting moving entities.

In one implementation, a WPPDS employs a through-wall-detection radar system to detect personnel. The system includes a light-weight (e.g., less than 1.5 pounds), portable, dedicated through wall system for detection through non-metallic walls. Particular implementations of the WPPDS are configured to detect both moving and stationary (breathing) personnel. In the case of locating an individual buried under structural debris, distance and angle to the individual, which may be critical to the life saving operation, are provided. In the case of hostage situations, the WPPDS may be used to determine the position of individuals from certain locations, which may dictate the rescue operation methodology.

A particular implementation employs an AN/PSS-14 mine detection radar system in a miniaturized 1.4 pound WPPDS unit that fits into a semi-automatic weapon (SAW) ammo pouch, and may operate for 180 twenty-second cycles and otherwise remain on standby during a 16 hour period running on eight disposable AA batteries. The WPPDS detects moving targets through non-metallic wall materials (e.g., cement blocks, reinforced concrete, adobe, wallboard and plywood).

The WPPDS may employ coherent, stepped-frequency continuous wave (SFCW) radar that provides excellent through wall detection performance. Detection is realized through range-Doppler processing and filtering to isolate human motion.

In various implementations, data from a SFCW radar may be processed as an ensemble of fixed-frequency CW radars, allowing for the optimum detection of the Doppler shift of a moving target over time via spectral analysis. The stepped-frequency radar data may also be processed to compress the bandwidth and obtain a high range resolution profile of the target. For example, the data may be processed to remove stationary or fixed time delay data, leaving the moving target data, to be evaluated in both the range and Doppler (velocity) dimensions. A coherent frequency-stepped radar may have an advantageous signal gain when computing the range and Doppler values of moving targets. Pulse type or frequency chirp type radars may not be able to achieve the same integrated signal gain as stepped-frequency radar, due to a non-coherent nature.

Another property of a SFCW radar is the ability to operate in environments that exhibit high radio frequency interference (RFI). Short pulse and frequency chirp radar systems maintain a wider instantaneous receive bandwidth, enabling more RFI into a processing electronics chain and reducing the signal to noise/interference level, which may reduces sensitivity and may degrades detection performance.

In one implementation, the SFCW radar system enables detection of subtle and overt movement through non-metallic walls. The SFCW radar system uses processes that operate on hardware that is generally commercially available. The architecture of the SFCW radar system generally is less susceptible to jamming (intentional or unintentional) than other radar architectures. Additionally, the reduced bandwidth enables implementation of more highly integrated RF technology, resulting in a reduction in system size, weight and DC power.

With respect to the antenna, the antenna elements are miniaturized (scaled) versions of the AN/PSS-14 cavity-backed spiral design. The miniaturized tactical antenna supports the selected frequency range (the upper end of the V4/PSS-14 operating range, which improves performance against rebar) and packaging constraints.

The RF Electronics generate the frequency-stepped radar waveform, amplify the signal for transmission, receive energy reflected off targets using a low-noise front end, and generate coherent (in-phase and quadrature, or I & Q) signals used in the detection process. The transceiver electronics feature a reduced bandwidth, which enables a single VCO implementation compared to a more complex two VCO design. Further system miniaturization is achieved through implementation of a direct down-conversion (homodyne) receiver. A brassboard homodyne receiver has shown that significantly increased detection range in through wall applications is achievable compared to the phase-noise limited AN/PSS-14 super-heterodyne architecture. The reduced bandwidth of the single-board TX/RX provides sufficient range resolution capability to support detection, and it avoids the NTIA/FCC restrictions associated with ultra wideband (UWB) radars. The transmit power, coupled with the gain of the antenna, results in a low radiated power (approximately the same as cell phones), making the system safe for human exposure.

The digital signal processor (DSP) hosts the motion detection algorithms The WPPDS signal processing algorithm incorporates coherent integration gain and robust detection algorithms, achieving superior performance with greater detection range, higher probability of detection (Pd), and lower probability of false alarm (Pfa). Particular implementations may be used to scan through damp concrete blocks and rebar, so as to permit ready detection of moving personnel.

The system also include power supply circuitry needed to convert 6V battery power for the electronics. Bottoms-up power consumption calculations show that a set of disposable AA alkaline batteries may provide 180 twenty-second operating cycles.

The low power, compact, high-performance direct-conversion radar transceiver is realized through use of state of the art RF MMICs and the RF integrated circuits available. An ultra-low phase noise TCXO housed in a miniature surface-mountable package is used as a reference to a synthesizer chip with a VCO integrated on the chip. Loop response time and phase noise are achieved and optimized via an external loop filter, creating a stable, fast-locking signal source with low divider noise.

The signal source is then amplified by high-efficiency monolithic amplifiers with integrated active biasing circuitry and on-wafer DC blocking capacitors. This approach minimizes part count and current consumption. This low-noise VCO is also used in the demodulation of the received radar return, which provides considerable phase noise cancellation due the oscillator coherency. With much lower phase noise riding on returned signals (including near-wall reflections), the receiver sensitivity is predominantly limited by thermal noise, enabling increased detection range compared to the AN/PSS-14 radar receiver. This also enables an increase in transmit power for increased range.

The direct-conversion quadrature demodulator includes polyphase filters and ensures quadrature accuracy across the entire bandwidth. Pre-amplification of the LO and integrated variable gain control of the demodulated signal allow for efficient use of circuit board real estate and provide the system with signal conditioning flexibility to maximize signal dynamic range at the ADC inputs.

The DSP is used to process IQ data from the radar transceiver to determine if objects are in motion and, if so, to alert the user. The DSP has many features for power management, including dynamic frequency control, dynamic core voltage control, and the capability of turning off unused sections of the IC. These power management features make this DSP an excellent choice for battery operated WPPDSs. Operating the WPPDS at half the frequency and a core voltage of 1V allows us to lower the power and also provides us with a programmable performance upgrade for the future. A clock frequency is provided by the RF transceiver board via an LVDS differential clock driver. This helps protect signal integrity and reduces EMI caused by the fast clock edge rates.

The design features 8 M bytes of SDRAM for fast program access and enough storage for 60 seconds of captured data per operating cycle. In addition, 4 M bytes of FLASH memory are used for booting up the DSP and for non-volatile storage. A USB interface is used as a test port, and will only be powered up for debugging and data collection. An analog to digital converter (ADC) includes an 18 bit ADC, that allows a 15 dB increase in SNR to take advantage of the increased dynamic range and sensitivity. Differential inputs improve common-mode noise cancellation, allowing for a more sensitive detector. The op-amps are selected for low power, low noise performance as amplifiers and active filters A 16 bit DAC is used to cancel the DC offset from the incoming IQ signals from the RF Electronics. SPI serial communication protocol is used to communicate with the ADCs, DAC, and RF PLL, which helps reduce I/O requirements and EMI.

Figure 6:
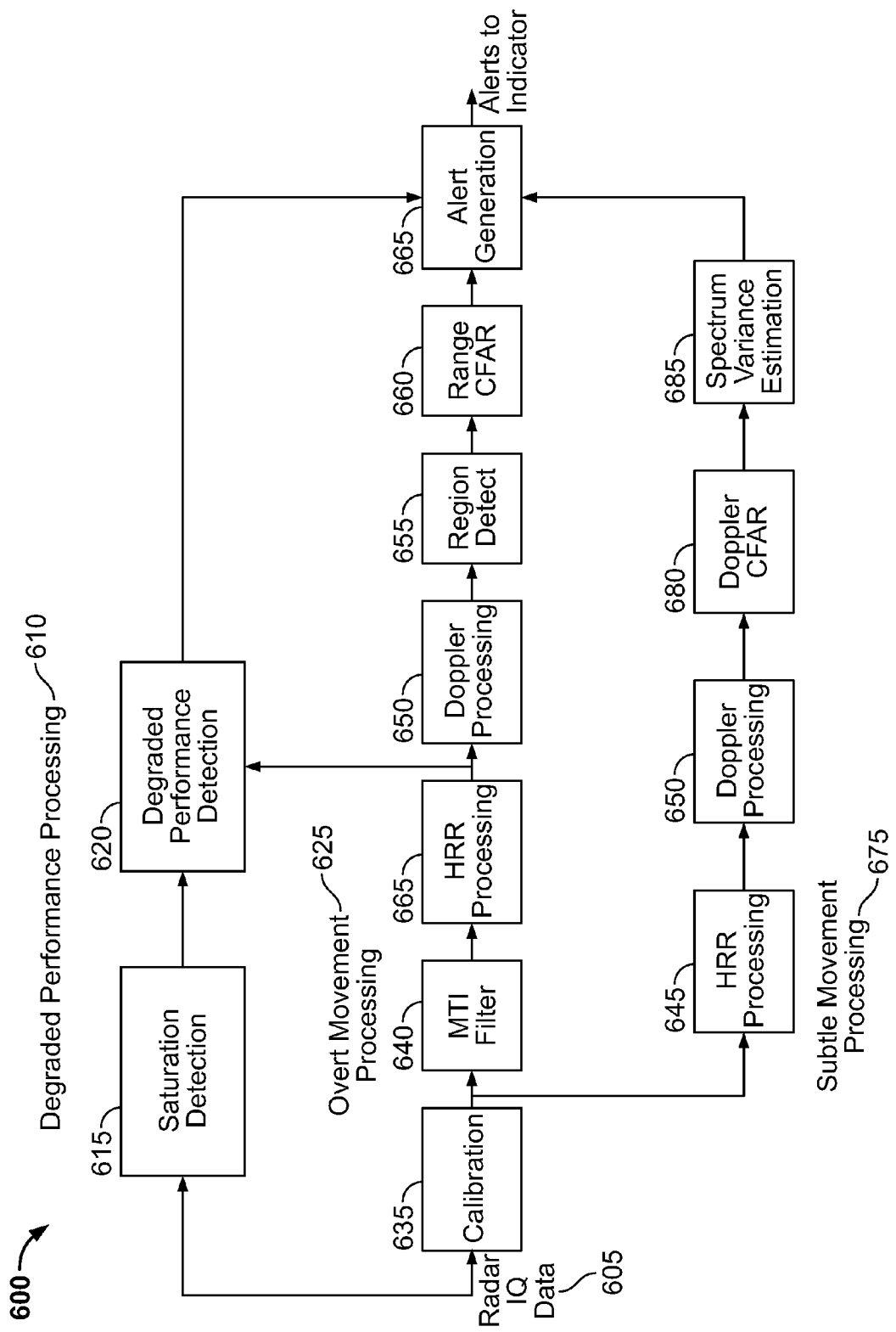
FIG. 6 is a flow chart of a process for processing radar signals received by a handheld stepped-frequency scanner.

Referring to FIG. 6, data may be processed according to process 600 that may be implemented on the system 100 of FIG. 1B. The process 600 receives IQ data that may be generated, for example, as discussed with respect to FIG. 3. The process 600 involves multiple signal processing steps, including degraded performance processing 610, overt movement processing 625, and subtle movement processing 675. For simplicity, the types of signal processing are discussed separately, though the different types of processing may be concurrently carried out on the same input signals. Each processing type may be associated with a specific alert generation function 665. In various implementations, in both overt movement processing 625 and subtle movement processing 675, phase and/or frequency data for each transmitted frequency is first used to develop a current picture of an environment, and is then compared against further phase and frequency data to determine differences.

The processing method incorporates coherent integration gain and robust detection algorithms, achieving superior performance with greater detection range, higher probability of detection (Pd), and lower probability of false alarm (Pfa).

The process 600 begins when IQ data is input to be processed 605. In one implementation, the user inputs one or more commands associated with either overt moving processing 625, subtle movement processing 675, or both. In various implementations, a single command may be pressed, which may, depending on the reflected signal, trigger overt moving processing 625, subtle movement processing 675, or both. IQ data is input to a calibration function 635 and to a saturation detection function 615. The saturation detection function 615 sends data to a degraded performance detection 620 function, which monitors for situations including detection of A/D converter saturations or unusually high signal levels that may arise from the transmitted signal reflecting off metal objects buried within or behind walls, detection of significant increases in the noise floor resulting from intentional or unintentional jamming, and detection of significant signal energy across all range cells associated with excessive movement of the antenna. The data from the degraded performance detection 620 is sent to the alert generation function 665, which may trigger an alert to specify the detection of a degraded signal. The alert may signify to the user that processing results may be less reliable. Degraded performance processing 610 need not interrupt other processing.

In overt movement processing 625, the IQ data may first be sent through a calibration function 635 to minimize the effects of non-ideal transceiver hardware. Calibration provides compensation for DC offset errors, IQ gain and phase imbalance, and gain and phase fluctuation across frequency. Target detection performance may be improved as a result of cleaner range and Doppler profiles. Hardware support for this function includes solid state RF switches in the receive and transmit antenna front end(s) that enable the receiver input to be switched from the antenna to either resistive load or to a reduced power sample of the transmit signal. Calibrated data may be used in overt movement processing 625 and subtle movement processing 675.

Overt movement processing 625 is optimized for rapid detection of moving personnel. Processing delays associated with filtering and coherent integration are short, providing an alert of detectable movement within one second of the event. The overt movement processing 625 begins with the data output from the calibration function 635 input to the moving target indication (MTI) filter 690 to eliminate strong returns from stationary clutter, or returns from objects within a proximity from the WPPDS (e.g., objects on the same side of a wall as the WPPDS). Each transmit frequency may be processed by a separate filter having a bandpass response that passes signals from separate target velocities. Separate filters may enable detection of short duration movements from the arms and legs of stationary personnel as well as the detection of the main body movement, such as walking and running.

The data output from the MTI filter 640 is input to the high range resolution (HRR) process 640. In one implementation, the HRR process 640 uses an inverse fast fourier transform (IFFT) to transform the ensemble of returns from the received signal to HRR profiles. In other implementations, other transforms may be used. Depending on the characteristics of the results, the HRR process 640 results may be input to the degraded performance detection 620 as well as Doppler processing 650.

Doppler processing 650 may provide additional coherent integration gain to further improve the signal-to-noise ratio. A region detection 655 function then selects a Doppler bin with amplitude regions from range resolution cells. The region amplitudes are passed on to a Range constant false alarm rate (CFAR) function 660.

The Range CFAR function 660 is a cell-averaging constant false alarm rate (CA-CFAR) detector and operates along the HRR range cells output from the region detector 655. The range cells are compared to the surrounding cells. A detection may be sent to the alert generation 665 if calculated parameters of the cell under test are greater than a predetermined amount.

The alert generation 665 function may perform additional clean-up of the detection map, including, for example, removal of detections beyond a range, and encoding the detection as either near or far.

Subtle movement processing 675 is optimized for detection of stationary personnel whose only significant movement is that caused by respiration. Subtle movement processing 615 includes the calibration function 635, the HRR process 645 and the Doppler processing 650, but with longer integration times. A longer integration time provides fractional-hertz Doppler resolution to resolve the carrier modulation sidebands associated with breathing. The HRR process 645 is performed directly on the calibrated radar data, bypassing the MTI filters that may otherwise remove the respiration sidebands In subtle movement processing 675, the output of the Doppler processing 650 is sent to a Doppler CFAR function 680. The Doppler CFAR function 680 may be applied across the Doppler processing 650 output to identify portions of the spectrum that are significantly above the noise floor. Values selected by the Doppler CFAR function 680 may be input to the spectrum variance estimation 685 function where the power-weighted second-moment of the spectrum is determined. If the calculated spectrum variance 685 is within limits typical of respiration, the alert generation function 665 may declare detection of subtle movement.

Figure 7A:
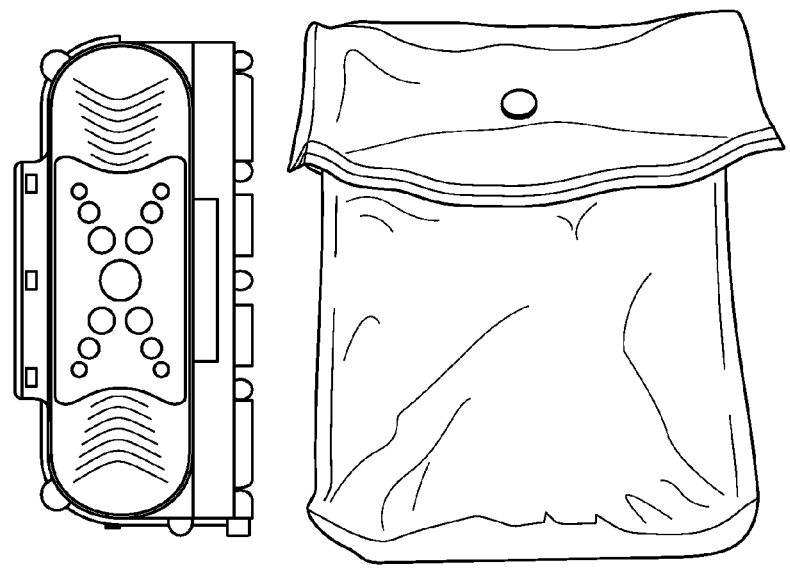
FIG. 7A is a picture of a handheld stepped-frequency scanner relative to a semi-automatic weapon ammo pouch.
Figure 7B:
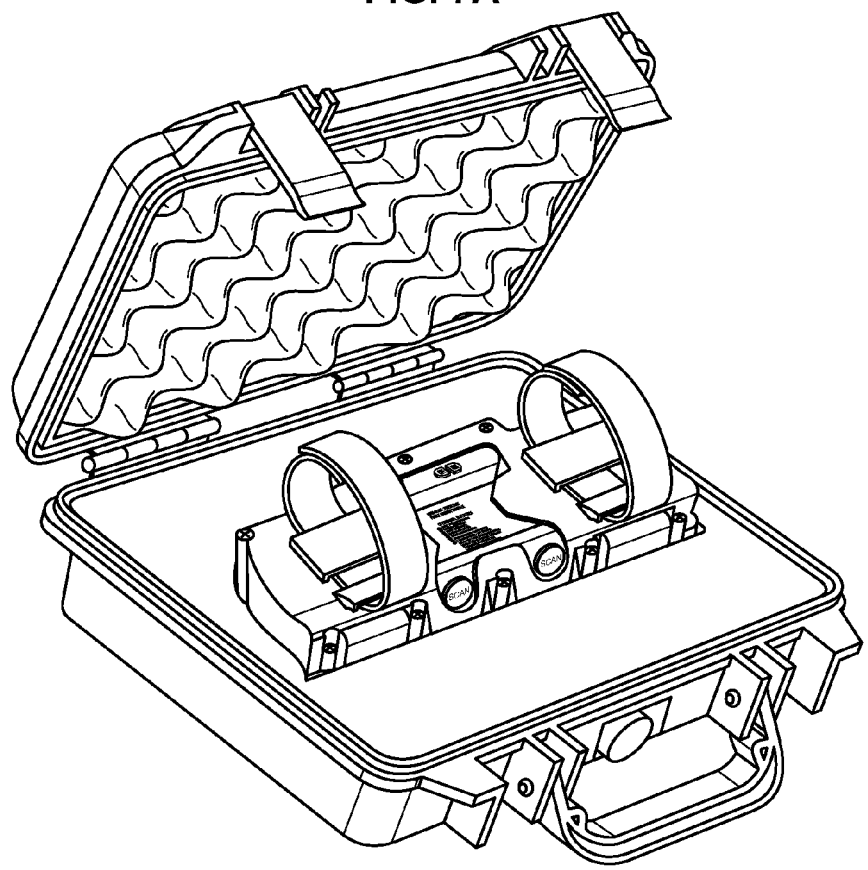
FIG. 7B is a picture of a handheld stepped-frequency scanner in a case.

Referring to FIGS. 7A and 7B, the compact WPPDS package enables single-handed operation while providing robust protection for the intended application. The unit may also be attached to the forearm or upper arm via straps. As shown in FIG. 7A, the unit fits in a SAW ammo pouch. The housing layout is able to be configured with three circuit card assemblies (CCA), which enables an optional integrated battery recharging circuit, such as a generally commercially available integrated battery recharging circuit. The miniature cavity-backed spiral antennas each contain a planar feed assembly that connects directly to the RF CCA. The Digital CCA contains the DSP as well as the power supply (PS) circuitry.

As shown in FIG. 7B the WPPDS unit and accessories fits into a standard Pelican case for storage and transportation. The packaging provides protection against transportation shock and vibration, environmental protection, and facilitates safe storage and ease of handling while in daily use by soldiers or rescuers. The case includes compartments for storing arm straps, extra batteries, and an optional vehicle-compatible AA battery recharger.

To deploy, the operator may hold the system by the straps or by the sides of the unit, affix the unit to either arm via the straps (forearm or upper arm), or mount the system to a pole or tripod (pole/tripod not provided with unit). A standard video camera mount may be connected to the bottom of the unit to facilitate mounting to a tripod or pole. The housing design also features raised stiffener ridges on the front that may facilitate temporary wall mounting using putty.

Figure 9A:
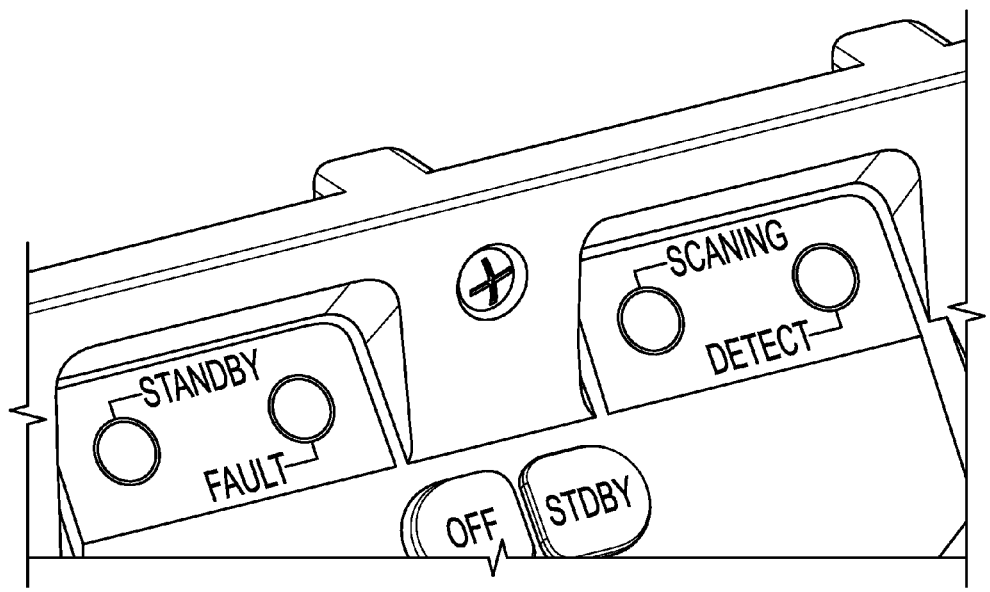
FIG. 9A is a picture illustrating recessed light emitting diodes in a handheld stepped-frequency scanner.

The housing is made of impact-resistant ABS plastic to help provide protection if the case is dropped or collides with hard objects that may occur during training exercises or during operation, such as on a battlefield or in a rescue operation. The external design of the housing incorporates human factors features to simplify operation in difficult environments. The light emitting diodes (LEDs) are recessed to provide shadowing to enhance daytime vision, as illustrated in FIG. 9A. A rubber shield protects the front of the unit. Rubber grip pads are also provided in four areas to facilitate slip-free handheld operation. Multiple SCAN switches support a variety of operational situations.

Figure 8A:
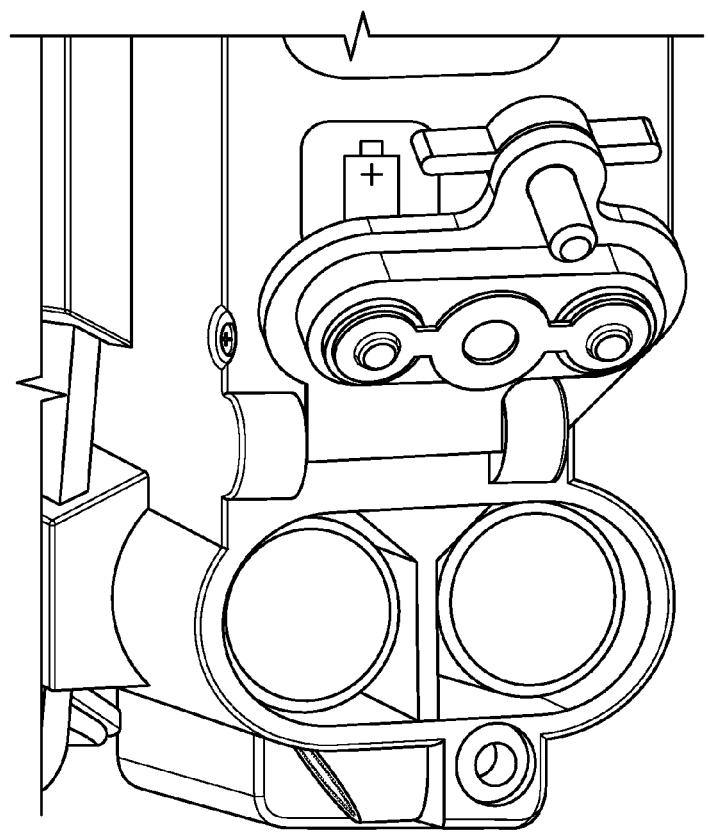
FIG. 8A is a picture illustrating battery access in a handheld stepped-frequency scanner.
Figure 8B:
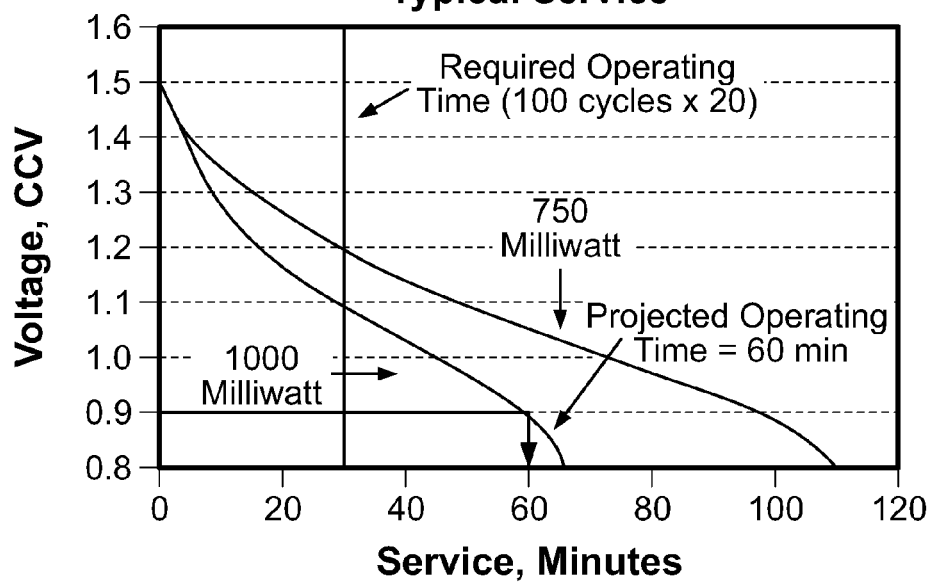
FIG. 8B is a graph illustrating power discharge characteristics in a handheld stepped-frequency scanner.

For operational simplicity, WPPDS is designed to operate while powered by AA batteries, as shown in FIG. 8A. The PS connects to the battery holder assembly, which features all eight batteries in the same orientation for easy installation under low light/time critical conditions. The total power draw from AA batteries is estimated to be 2.2 W. Four batteries are connected in series, and 2 sets of 4 batteries in parallel. This provides 6V and divides the power by the 2 battery sets. During run time the individual battery voltage is allowed to decay from 1.4V to 0.9V, providing approximately 1 hour of operation time, as shown in FIG. 8B.

As shown in FIG. 9A, a simple operator interface provides features to support required operational capability.

Figure 9B:
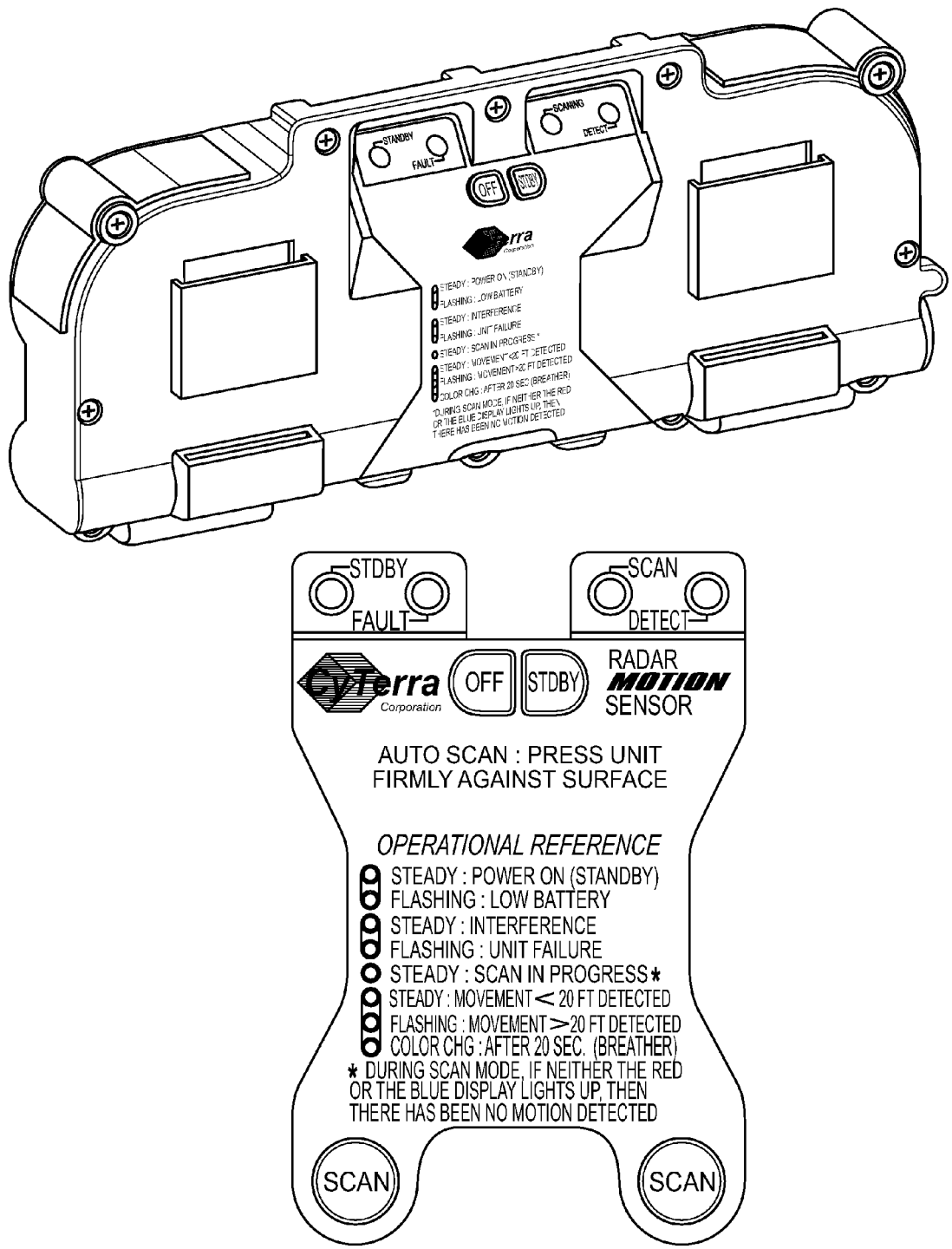
FIG. 9B is a picture illustrating operational controls of a handheld stepped-frequency scanner.

Referring to FIG. 9B, power ON/OFF is controlled via OFF and STDBY switches. In Standby mode the circuitry is placed in a power-save mode, and activation of any one of three SCAN pressure switches (one front, two bottom) initiates immediate sensor operation. The system returns to standby mode when the SCAN button is released. Other implementations may include other interface arrangements. For example, a combination of two SCAN switches could be simultaneously pressed (but not held) to enable timed operation, such as when the unit is temporarily adhered to or leaned against a wall, or mounted to a tripod, for hands-off operation.

Four color LEDs provide indications to the operator. The yellow STANDBY LED indicates power status: steady illumination indicates power is on; flashing LED indicates low battery power. The red FAULT LED indicates one of several conditions: steady illumination indicates that the system is unable to make an accurate measurement due to metal blockage, electromagnetic interference, or excessive motion of the sensor; flashing illumination indicates a built-in-test (BIT) failure. The green SCANNING LED remains illuminated while the unit is operating to detect motion. The blue DETECT LED indicates that motion has been detected. Steady illumination indicates personnel motion detection at a closer distance. A flashing DETECT LED indicates personnel motion detection at a farther distance. A change in color for the blue DETECT (to Magenta) indicates that subtle movement has been detected.

The system may be powered on and placed in standby mode by momentarily pressing the STDBY switch. The unit may be powered off by simultaneously pressing the STDBY and OFF switches. This may prevent accidental power-down during normal operation should the OFF switch get accidentally bumped. In STDBY mode, circuitry is activated in power-save mode, and the unit may be immediately operated by pressing one of the SCAN switches. The front SCAN switch may be activated by pressing and holding the WPPDS unit against the wall to be penetrated. One of two bottom SCAN switches may be activated by squeezing with the thumb (normal unit orientation) or index finger (inverted orientation), or by pressing the unit against the knee or thigh when in a kneeling position.

When any SCAN switch is depressed, the green SCAN LED may illuminate, and may remain illuminated as long as the SCAN switch is depressed. This may alert the operator that the unit is operational (i.e., that the SCAN switch is properly depressed). A blue DETECT LED may be used to alert the operator of detected personnel.

The unit may also be programmed to detect subtle movement. This mode may be initiated by pressing any SCAN switch twice in rapid succession. The green SCAN LED may pulsate slowly when this mode is active (similar to a laptop's power LED in standby mode). The blue DETECT LED may illuminate when slow movement (respiration) is detected.

Because the antennas have conical radiation patterns, the unit may be arbitrarily oriented (within the plane of the wall); i.e., when held against the wall, the unit may be oriented horizontally, vertically, or in any other position without impacting operational performance. The unit may also be held off the wall (standoff), provided it is held still during SCAN operation.

Although the techniques and concepts have generally been described in the context of a handheld stepped-frequency scanner, other implementations are contemplated, such as a vehicle-mounted stepped-frequency scanner.

Other implementations are within the scope of the following claims.

What is claimed is:

1. A method of sensing moving entities, the method comprising:
   transmitting a stepped-frequency radar signal including a plurality of frequencies through a wall from a first side of the wall to a second side of the wall;
   receiving reflected portions of the radar signal with a first antenna arranged to receive signals reflected by the first side of the wall and a second antenna arranged to have a field of view opposite the first antenna;
   processing the reflected portions received from the first and second antennas to generate processed data including information associated with frequency shifts between the transmitted signal and the reflected portions of the radar signal received from the first antenna; and
   analyzing the processed data to determine if reflected portions are associated with moving entities located beyond the second side of the wall, the analyzing including differentiating reflected portions of the radar signal received from the first antenna from reflected portions of the radar signal received from the second antenna.

2. The method of claim 1, wherein analyzing the processed data includes calibrating the processed data.

3. The method of claim 2, wherein calibrating the processed data includes compensating for reflections near the device.

4. The method of claim 2, wherein calibrating the processed data includes compensating for reflections behind the device.

5. The method of claim 2, wherein the processed data is calibrated for each separate attempt to sense moving entities.

6. The method of claim 1, wherein analyzing the processed data includes removing information associated with reflections from stationary objects.

7. The method of claim 1, wherein analyzing the processed data includes removing information associated with reflections from objects within a proximity to the device.

8. The method of claim 1, wherein analyzing the processed data includes performing a Fourier transform on information associated with the processed data, the method further comprising detecting degraded performance based on whether results of the Fourier transform meet a characteristic.

9. The method of claim 1, wherein analyzing the processed data includes performing a first Fourier transform with a first integration time and a second Fourier transform with a second integration time longer than the first integration time on the same information associated with the processed data.

10. The method of claim 9, further comprising detecting degraded performance based on whether results of the first Fourier transform meet a first characteristic and results of the second Fourier transform meet a second characteristic different from the first characteristic.

11. The method of claim 1, wherein analyzing the processed data includes analyzing frequency and phase shifts between the transmitted signal and the detected signal to determine movement of objects at a distance.

12. The method of claim 1 wherein the transmitting, receiving and processing is performed by a portable device.

13. The method of claim 12 wherein the portable device comprises a handheld device.

14. A system for sensing moving entities, the system comprising:
   a stepped-frequency radar transmitter coupled to a transmit antenna to transmit a stepped-frequency radar signal;
   a first antenna configured to detect portions of the radar signal reflected by a side of a wall on which the system is located;
   a second antenna arranged to have a field of view opposite the first antenna and configured to detect reflected portions of the radar signal; and
   a processor operable to process, for a plurality of frequencies, the reflected portion of the radar signal from the first and second antennas, and to analyze the processed data to determine the presence of moving entities, the analyzing including differentiating reflected portions of the radar signal received from the first antenna from reflected portions of the radar signal received from the second antenna,
   wherein the system is configured to determine the presence of moving entities on an opposite side of the wall from the side of the wall on which the system is located.

15. The system of claim 14 further comprising a demodulator which receives both the stepped-frequency radar signal and a reflected portion of the radar signal, wherein the demodulator outputs in phase and out of phase data.

16. The system of claim 14, wherein the system is configured to be operable using AA batteries.

17. The system of claim 14, wherein the processor is configured to remove information associated with signal reflection from stationary objects.

18. The system of claim 14, wherein the processor is configured to remove information associated with signals reflected from objects within a proximity to the device.

19. The system of claim 14, wherein the processor is configured to perform a first Fourier transform with a first integration time and a second Fourier transform with a second integration time longer than the first integration time on the same information associated with the processed data.

20. The system of claim 14, wherein the processor is configured to calibrate or process reflected portions of the radar signal based on which of the first and second antennas receives the reflected portion of the radar signal.

21. The system of claim 14 wherein the system comprises a portable device.

22. The system of claim 21 wherein the portable device comprises a handheld device.

* * * * *